United States Patent [19]

Firester

[11] 3,965,439
[45] June 22, 1976

[54] ELECTROOPTIC-Q-SWITCHING SYSTEM FOR A LASER

[75] Inventor: Arthur H. Firester, Skillman, N.J.

[73] Assignee: The United States of America as represented by the Secretary of the Army, Washington, D.C.

[22] Filed: Dec. 3, 1974

[21] Appl. No.: 529,144

[52] U.S. Cl. .................... 331/94.5 Q; 350/160 R
[51] Int. Cl.² .......................................... H01S 3/11
[58] Field of Search ............... 331/94.5; 350/160 R

[56] References Cited

OTHER PUBLICATIONS

Hook et al., Laser Cavity Dumping Using Time Variable Reflection, Appl. Phys. Lett., vol. 9, No. 3 (Aug. 1, 1966) pp. 125–127.

Primary Examiner—William L. Sikes
Attorney, Agent, or Firm—Nathan Edelberg; Max L. Harwell; Robert P. Gibson

[57] ABSTRACT

A Q-switching system within a laser cavity in which the system comprises configurations of electrooptic material that have electrodes thereacross which are connected to a direct current voltage source through a switching circuit. The voltage is applied to the electrodes by the switching circuit at a rate commensurate but not appreciably faster than the time the lasing medium takes to replenish its stored energy. When the voltage is applied on the electrodes the electrooptic material becomes birefringent and the plane of polarization of the light is rotated 90°, thus causing loss in the system and the laser to store more energy before pulsing. When the switching circuit quickly removes the voltage from the electrodes, the loss is thus quickly removed and the laser produces a larger peak power pulse even though the average power remains the same.

5 Claims, 3 Drawing Figures

ELECTROOPTIC-Q-SWITCHING SYSTEM FOR A LASER

BACKGROUND OF THE INVENTION

With emphasis on smaller and more powerful lasers, a means is needed to cause a laser to produce more peak power without having to increase the average power to do so.

The field of art to which the present invention pertains is in an electrooptic switching system that is used to introduce a loss in the laser cavity and then quickly remove the loss such that energy stored in the laser while the loss was present is dumped instantaneously with a resulting high peak power pulse.

SUMMARY OF THE INVENTION

The invention relates to laser cavity Q-switches that comprise two configurations of elecrooptic material which introduce reflective losses from a Brewster angle surface when voltage is applied thereacross, but has low intrinsic loss when the voltage is removed. A voltage from a voltage source is connected across the electrooptic material by way of a switching circuit. When a proper voltage, called the half wave voltage and is produced by the voltage source, is switched across the electrooptic material, the material becomes birefringent and the plane of polarization of the light in passing through the electrooptic material is rotated 90°. A reflective loss is produced by the 90° rotation and therefore the laser stores a larger amount of energy before lasing. By switching the half wave voltage at a rate commensurate with the energy storage rate of the laser the peak pulse power is increased and the fundamental laser may be increased in frequency, such as from 1 micron (infrared) to ½ micron (green).

DETAILED DESCRIPTION OF THE PREFERRED EMBODIMENT

Figure 1:
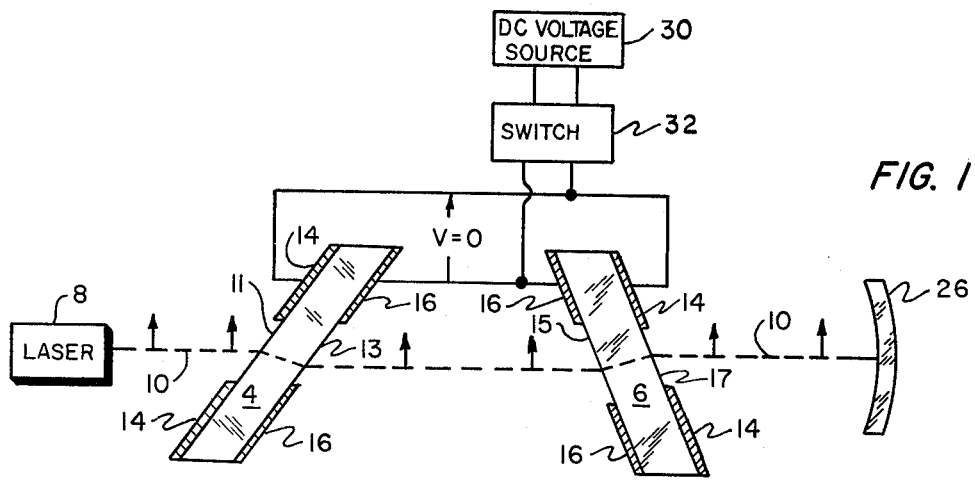
FIG. 1 illustrates one configuration of the present invention showing the path of polarized light through two laminae of electrooptic material when no voltage is applied thereacross.
Figure 2:
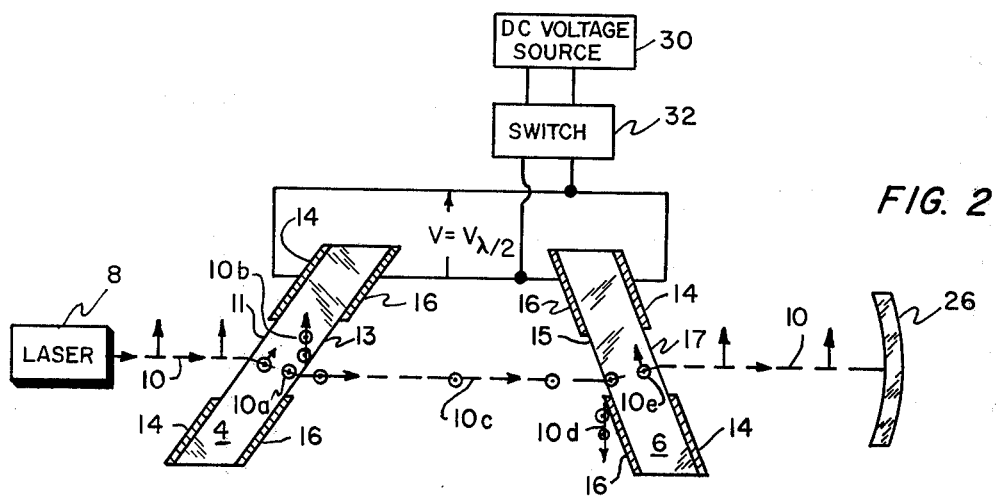
FIG. 2 illustrates the configuration of FIG. 1 with voltage applied across the two laminae.

The present invention comprises two configurations of electrooptic material which are used to provide Q-switching for a laser. These configurations are positioned in a laser cavity to increase the peak pulse power of the laser and to cause frequency multiplication of the fundamental laser. One embodiment is shown in FIGS. 1 and 2 and comprises two laminae 4 and 6 of electrooptic material that are positioned at about 34° angles along the optical axis of a laser cavity to position laminae 4 and 6 at the Brewster angle. The optical axis is considered to be along the line shown as 10. Light that travels long optical axis 10 is assumed to be polarized in the direction perpendicular to line 10 as shown by the perpendicular arrowed lines. In both FIGS. 1 and 2, the arrows along line 10 represent the light path from left to right but the light oscillates back and forth in both directions.

Referring now to FIG. 1, the two laminae configuration is shown in the environment in which it operates, i.e. along the optical axis and in the laser cavity (with the actual enclosure not shown) between laser 8 and end reflecting mirror 26. Laser 8 has a polarized light beam output along optical axis 10, with the polarization shown by the arrows perpendicular to line 10 and in the plane of the paper. Electrodes 14 and 16 are connected in parallel to a direct current (d.c.) voltage source 30 through switch 32. In FIG. 1, switch 32 is open so that no voltage from source 30 gets through to either of electrodes 14 and 16. With no voltage across laminae 4 and 6, the polarized light travels through both laminae on to the end mirror 26 and is reflected back through both laminae with essentially no reflection losses at surfaces 11, 13, 15, and 17 and with the light remaining polarized in the same direction.

Electrodes 14 and 16 are in physical contact with the electrooptic laminae 4 and 6. These electrodes may be a mechanical holder for the electrooptic material or may be deposited thereon integral with electrical contacts that lead back to switch 32. The value of voltage in the d.c. voltage source 30 is generally 1,500 volts but may be as high as 2,500 volts for reasons stated below. Switch 32 could be an electronic high voltage vacuum tube, such as tubes used in transmitters, with the switching rate being about 2,000 times per second. The voltages applied to electrodes 14 and 16 by switch 32 are switched at a rate commensurate with but not appreciably faster than the time the lasing medium of laser 8 takes to replenish its stored energy. In the present invention, laser 8 is assumed to be a Nd:YAG, tungsten pumped laser with a maximum switching rate of 2,000 times per second, but may be other type laser switched appropriately. Suitable material for electrooptic materials 4 and 6 may include electrooptic material of symmetry class $\overline{4}2m$. Such materials may be from the following, but are not limited thereto. However, the same material should be used for both 4 and 6 since the same voltage of source 30 is applied to both 4 and 6. These materials may be $KH_2PO_4$ (KDP), $KD_2PO_4$ (KD*P), $KH_2AsO_4$ (KDA), $KD_2AsO_4$ (KD*A), $RbH_2PO_4$ (RDP), $RbH_2AsO_4$ (RDA), $CsD_2AsO_4$ (DCDA), etc.

FIG. 2 shows the same configuration as FIG. 1 with switch 32 closed and the d.c. voltage from source 30 applied to parallel connected electrodes 14 and 16. Electrodes 14 and 16 are circular with an opening along the optical axis 10 so that polarized light from laser 8 is not impeded by these electrodes. These electrodes are shown in section on a side view of laminae 4 and 6 so as to emphasize the circular shape of the electrodes. The voltage applied across electrodes 14 and 16 is the half wave voltage of material 4 and 6, and is represented by $V_{\lambda/2}$. This half wave voltage is the value of voltage that causes the plane of polarization of the laser light to rotate by 90° during transmission through materials 4 and 6. A dotted circle, shown as 10a, illustrates the polarized light that entered laminae 4 from the left as being rotated 90° or perpendicularly away from one looking directly at FIG. 2. The rotation represented by dotted circle 10a actually occurs at surface 13. With the polarized light rotated through 90°, there is a reflective loss at surface 13 which is at the Brewster angle. This reflective loss is represented by direction arrow 10b. The light having experienced the reflective loss 10b, continues on from left to right between laminae 4 and 6 rotated by 90°. This path between laminae 4 and 6 is represented by 10c. When light along path 10c strikes surface 15, there is another reflective loss, represented by direction arrow 10d. The light then continues left to right through laminae 6 and is rotated back through the path of the originally rotated 90° while traveling from surface 15 to surface 17 through 6. The light leaves surface 17 polarized back in the original direction as when it first exited laser 8. Polarized light along this path is also represented by 10 since it is polarized in the same direction between surface 17 and end reflecting mirror 26 as between laser 8 and surface 11.

When the polarized light is reflected off mirror 26 and returns back through laminae 6 and 4 toward laser 8, the same reflective loss process is encountered. That is, returned light is reflected off surface 15 back into material 6 at 180° from direction arrow 10d and off surface 13 at 180° from direction arrow 10b. Light suffers about a 20 percent loss on each trip through laminae 4 and 6.

Figure 3:
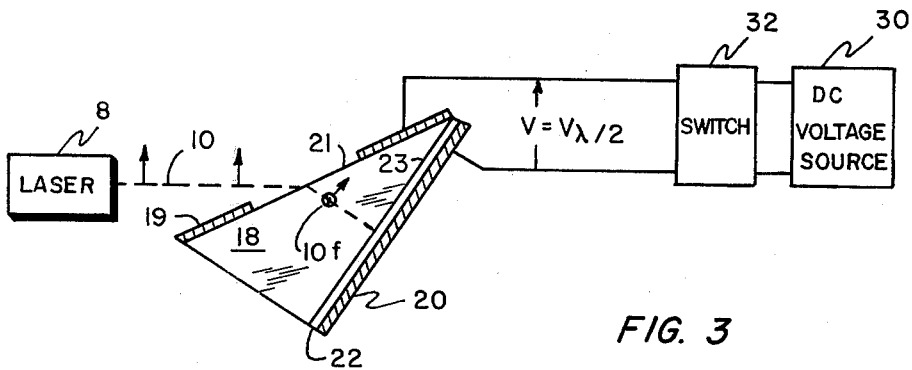
FIG. 3 illustrates a second configuration of the present invention.

FIG. 3 illustrates a configuration using a wedge prism of electrooptic material 18 having a multilayered dielectric reflector 22 on the flat back side 23 thereof that is opposite the laser 8 in which 22 functions as the end reflecting mirror for the laser cavity. A solid layered back electrode 20 is contiguous with layer 22. A circular front electrode 19 having an opening along optical axis 10 is contiguous with the beveled front side 21 of the prism of electrooptic material 18. FIG. 3 is shown with polarized light from laser 8 entering prism 18 along the optical axis 10 and going through the 90° rotation within electrooptic material 18. The voltage of source 30 is the proper half wave voltage of material 18 to produce the 90° rotation of the polarized light when switch 32 is closed. Dotted circle 10f represents the partial rotation of the polarized light within material 18. Multilayered dielectric reflector 22 comprises 10 to 16 alternate layers of refractive materials, such as magnesium fluoride and zinc sulfide. Each layer has an optical thickness of one-quarter wavelength at the wavelength for which the high reflectivity is desired. Thus, the overall thickness will depend on the laser wavelength and the materials used. The order of magnitude of the thickness is 2 – 3 micrometers.

In operation of either the prism or two laminae of electrooptic material used as a Q-switch, switch 32 remains closed until voltage from source 30 causes the electrooptic material to be birefringent and thus create the reflective losses by rotation of the polarized light through 90° and then switch 32 is quickly opened. Laser 8 stores appreciably more energy than normal while electrooptic material is birefringent and then releases this additional energy into a laser power pulse when switch 32 is opened. Switch 32 continues switching at a rate commensurate with the energy storage time of the material of laser 8. There are reflective losses of from 10 to 20 percent by the passage of the polarized light vector through the prism when material 18 has a voltage from source 30 thereacross.

For optimum use of the electrooptic materials of symmetry class $\overline{4}2m$ in both of the two configurations discussed above, the electrooptic material should be oriented such that the following conditions are met. The light path through the crystal, or crystalline solid electrooptic layer, should be along the optic axis and the x or y axis should be in the plane of incidence. The electrooptic material should be used in the longitudinal configuration with longitudinal electrode structures 14 and 16 of the two laminae configuration and 20 and 21 of the wedge configuration insuring that the d.c. electric field is along the direction of the light beam path 10. With the electric field in this direction, the necessary half wave voltage is independent of the thickness of the electrooptic material. Therefore, the electrooptic material can be made very thin and thereby reduce the light losses through the material.

In addition to acting as a Q-switch of reasonable loss, the present devices serve to polarize the fundamental laser by introducing a reflective loss which is always present for light polarized perpendicular to the plane of incidence.

While only two embodiments of the invention have been disclosed, it is to be understood that variations in the details of fabrication, the materials used, and the combination and arrangement of elements may be made while remaining within the spirit and scope of the invention which is limited only by the following claims.

I claim:

1. An electrooptic Q-switching system for increasing the peak output pulse power and the frequency of a laser, the system comprising:
   a laser positioned on one side of a laser cavity, said laser producing a polarized light beam along the optical axis of said laser cavity;
   an end reflecting mirror positioned on the optical axis and at the opposite end of said laser cavity from said laser;
   a longitudinal configuration of crystalline electrooptic material positioned in said laser cavity between said laser and said end reflecting mirror, said crystalline electrooptic material having longitudinal electrodes in physical contact on each side thereof wherein each of said longitudinal electrodes has an opening along said optical axis so said polarized light beam may pass therethrough, with the surface of said crystalline electrooptic material positioned at the Brewster angle from said optical axis wherein said polarized light beam travels down the optic axis of said crystalline electrooptic material;
   a direct current voltage source; and
   switching means connected between said direct current voltage source and said longitudinal electrodes wherein said switching means alternately connects a voltage from said direct current voltage source to said longitudinal electrodes such that the electric field momentarily produced in said crystalline electrooptic material is along said optical axis and is at a rate commensurate with the time said laser takes to replenish its stored energy while lasing to cause optical loss and storage of excess energy in said laser while said voltage is connected to said longitudinal electrodes and when said voltage is removed the peak power of the laser pulse is increased by said excess energy.

2. A system as set forth in claim 1 wherein said longitudinal configuration of crystalline electrooptic material comprises two laminae of electrooptic material with the surface of each laminae positioned at the Brewster angle from said optical axis and wherein said longitudinal electrodes are electrically connected in parallel through said switching means to said voltage from said direct current voltage source.

3. A system as set forth in claim 2 wherein said electrooptic material is from crystalline symmetry class $\overline{4}2m$.

4. A system as set forth in claim 1 wherein said longitudinal configuration of crystalline electrooptic material is a single wedge prism of electrooptic material comprising:

a beveled front side that faces said laser and a flat back side with said flat back side having a multilayered dielectric reflector contiguous therewith and having a solid layered back electrode contiguous with said multilayered dielectric reflector wherein said multilayered dielectric reflector functions as said end reflecting mirror; and a front electrode contiguous with said beveled from side, said front electrode having an opening along said optical axis wherein said beveled front side is at the Brewster angle from the optical axis of said laser cavity and said polarized light beam travels down said optic axis of said crystalline electroopic material and is perpendicular to said multilayered dielectric reflector.

5. A system as set forth in claim 4 wherein said electrooptic material is $KH_2PO_4$(KDP).